Oct. 22, 1963
A. E. ECKERMANN, JR  3,107,422
RHODIUM DIFFUSION PROCESS FOR BONDING
AND SEALING OF METALLIC PARTS
Filed May 16, 1961
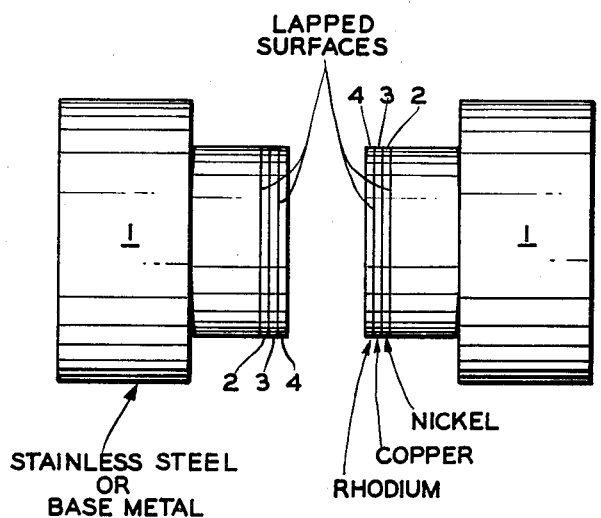
INVENTOR.
ALFRED E. ECKERMANN JR.
BY
ATTORNEY 3,107,422
RHODIUM DIFFUSION PROCESS FOR BONDING
  AND SEALING OF METALLIC PARTS
Alfred E. Eckermann, Jr., Hasbrouck Heights, N.J., assignor to The Bendix Corporation, Teterboro, N.J., a corporation of Delaware
Filed May 16, 1961, Ser. No. 110,382
4 Claims. (Cl. 29—492)

This invention relates to a process for uniting two pieces or parts of stainless steel or metal so as to form a strong mechanical bond and provide a hermetic seal between the two metallic pieces.

An object of the present invention is to provide a strong mechanical bond in joining two metal pieces and to keep this bond intact at temperatures of approximately 300° C. ambient.

Another object is to provide a strong mechanical bond and hermetic seal between two metallic parts by rhodium diffusion so that such parts may be readily utilized to enclose in hermetically sealed relation a space which may be placed under a high vacuum without leakage or a break through due to pressure differentials.

Such bonds find applications where organic adhesive methods cannot be used for fear of contaminating the environment, and in temperature ranges around 300° C. where soft soldering methods fail. Further the bonding method may find application where high temperature silver soldering techniques fail due to corrosion and contamination caused by the acidic flux needed by such methods. The method is particularly applicable in the uniting of parts of metal or stainless steel utilized in the enclosing of an evacuated space to provide a strong mechanical bond and hermetic seal to prevent a break through due to pressure differentials.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The drawing is a diagrammatic side view of two parts of a metal or stainless steel having adjacent surfaces prepared in accordance with the invention and to be united by the process of the invention.

Referring to the drawing, the two parts or pieces 1 of a stainless steel or metal to be joined are lapped flat on the adjacent joining surfaces. The pieces are then thoroughly cleaned by a suitable electro cleaning method, and then plated with a minimum of .000005 inch of nickel 2. Thereafter the surface 2 of nickel is thoroughly cleaned, and prepared for a copper plating. A copper sheath 3 approximately .001 inch in thickness is then plated over the nickel 2.

The copper surface 3 is then lapped to insure flatness on the surfaces to be joined between the parts. The copper surface 3 is then cleaned and freed from all foreign matter such as oil and grease, and then electro-cleaned. At this time the copper surfaces 3 of the parts or pieces 1 are rhodium plated with a film 4 of a thickness varying between .000005 and .00050 inch of rhodium.

The rhodium plated surfaces 4 of the parts or pieces 1 are then placed together and clamped with a clamping fixture so that the surfaces of the parts 1 fit congruently tight; for example, the usual C-type clamp may be utilized to effectively clamp the respective parts 1. While clamped in this position, the pieces are heated to a temperature of about 350° C. to 500° C. for approximately one hour and allowed to cool slowly.

During the heating of the pieces or parts 1 to the temperature of about 350° C. to 500° C. there is effected a rapid diffusion of the rhodium film 4 on each of the parts 1 into the rhodium film 4 on the adjacent other part 1, and into the copper sheath 3 immediately adjacent the rhodium film 4 so that when the rhodium film 4 on each part has sufficiently diffused into the rhodium film 4 on the other part 1 and into the copper sheath 3, it will be found that upon the cooling of the parts 1 there has been effected by such diffusion of the rhodium film 4 a strong mechanical bond and hermetic seal between the pieces or parts 1.

Further in effecting the foregoing rhodium diffusion process of bonding and sealing of the metallic parts 1, the nickel plating 2 on the respective parts 1 serves a two-fold function; first, to condition the metal or stainless steel of the parts 1 so as to render the same chemically inactive to the end that the copper plating 3 will exhibit a mechanically strong bond, and second, to act as a barrier to prevent diffusion of the rhodium film 4 into the stainless steel or metal of the parts 1. The nickel plating 2 has been found to have this ability in the described process.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A process of bonding surfaces of metal parts which comprises the steps of plating a surface of each part to be bonded with nickel; plating over the nickel a film of copper; plating over the copper a film of rhodium; firmly placing together the rhodium plated surfaces; holding the rhodium plated surfaces firmly together and heating the surfaces sufficiently to cause the rhodium film on one surface to diffuse into the rhodium film on the other surface and into the adjacent copper film; and thereafter cooling the surfaces so as to cause the diffused rhodium and copper films to form a mechanically strong and hermetically tight seal, the nickel acting as a barrier to prevent diffusion of the rhodium into the metallic surfaces of the metal parts.

2. A process of bonding metallic parts of stainless steel which comprises the steps of shaping surfaces of the stainless steel parts to fit congruently tight; cleaning said surfaces of the stainless steel parts; plating said surfaces with a film of a minimum of .000005 inch of nickel; cleaning the nickel plated surfaces thoroughly so as to prepare the last-mentioned surfaces for copper plating; plating a film of copper of approximately .001 inch in thickness over the film of nickel; lapping the surfaces to insure a congruently tight fit; cleaning the copper plated surfaces; plating the copper plated surfaces with rhodium in thickness varying between .000005 and .0005 inch; placing the rhodium plated surfaces together; holding the surfaces tightly together and while in this position heating the parts to a temperature of about 350° C. to 500° C. for substantially one hour so as to cause the rhodium plated surfaces to diffuse one into the other and through the copper film; the nickel film serving to prevent diffusion of the rhodium into the stainless steel surfaces of the respective parts and maintaining the copper film chemically inert with respect to the stainless steel surfaces of said parts; and thereafter cooling the parts so as to cause the aforesaid diffused rhodium and copper plated surfaces to form a mechanically strong and hermetically tight seal between the respective parts of stainless steel.

3. A process of bonding copper surfaces by means of an electroplated rhodium seal comprising the steps of plating the copper surfaces to be united with a film of rhodium; holding the rhodium plated surfaces firmly together and heating the surfaces sufficiently to cause the rhodium film on one surface to diffuse into the rhodium film on the other surface and into the adjacent copper surfaces; and thereafter cooling the surfaces so as to unite the respective parts and cause the diffused rhodium films to form with the copper surfaces a mechanically strong and hermetically tight seal.

4. A process of bonding metal parts comprising the steps of shaping the surfaces of the metal parts to fit congruently tight; cleaning the surfaces of the metal parts; plating the surfaces with a film of at least .000005 inch of nickel; cleaning the nickel plated surfaces thoroughly so as to prepare the last-mentioned surfaces for copper plating; plating a film of copper of at least .001 inch in thickness over the film of nickel; cleaning the copper plated surfaces; plating the copper plated surfaces with rhodium at least .000005 inch thick; placing the rhodium plated surfaces together; holding the surfaces tightly together and while in this position heating the parts to a temperature of about 350° C. to 500° C. so as to cause the rhodium plated surfaces to diffuse one into the other and into the copper film; the nickel film serving to prevent diffusion of the rhodium into the metal parts and maintaining the copper film chemically inert with respect to the metal parts; and thereafter cooling the parts so as to cause the aforesaid diffused rhodium and copper plated surfaces to form a mechanically strong and hermetically tight seal between the respective metal parts.

References Cited in the file of this patent

UNITED STATES PATENTS

| | | |
|---|---|---|
| 2,698,913 | Espersen | Jan. 4, 1955 |
| 2,719,797 | Rosenblatt | Oct. 4, 1955 |
| 2,781,481 | Armstrong | Feb. 12, 1957 |

OTHER REFERENCES

Metal Industry, March 26, 1948 (p. 250 relied upon).